United States Patent [19]
Geiger

[11] 4,214,724
[45] Jul. 29, 1980

[54] COLLAPSIBLE TRIPOD WITH SWIVEL LOCK

[76] Inventor: William N. Geiger, 13142 St. Thomas Dr., Santa Ana, Calif. 92705

[21] Appl. No.: 910,356

[22] Filed: May 30, 1978

[51] Int. Cl.² .......................................... F16M 13/00
[52] U.S. Cl. ..................... 248/167; 248/181; 248/288 B
[58] Field of Search ............... 248/167, 179, 181, 183, 248/184, 185, 186, 288 B, 515, 516; 403/90, 91

[56] References Cited

U.S. PATENT DOCUMENTS

| | | | |
|---|---|---|---|
| 1,931,714 | 10/1933 | Arthur | 248/167 X |
| 2,026,427 | 12/1935 | Miller | 248/167 X |
| 2,054,600 | 9/1936 | Hoza | 248/167 |
| 2,548,659 | 4/1951 | Epprecht | 248/181 |
| 2,552,921 | 5/1951 | Anderson | 248/127 |
| 2,752,116 | 6/1956 | Minnis | 248/186 X |
| 2,896,472 | 7/1959 | Starbird et al. | 248/183 X |
| 3,262,406 | 7/1966 | Nickolaisen | 108/157 |
| 3,307,813 | 3/1967 | Pleiss | 248/515 |
| 3,632,073 | 1/1972 | Nakatani | 248/181 X |
| 3,661,349 | 5/1972 | De Vries | 248/515 X |

Primary Examiner—William H. Schultz
Attorney, Agent, or Firm—Edward E. Roberts

[57] ABSTRACT

A collapsible tripod having a swivel ball mount within the housing is provided with a pressure plate normally urging against the swivel for locking its position. Three legs are provided, two of which are rotatably coupled to the bottom of the housing with the third leg being in a fixed position and having a release shaft manually operable relative to its longitudinal axis for actuating a pressure plate release mechanism within the housing for releasing the swivel for pivoting to a new position.

8 Claims, 2 Drawing Figures

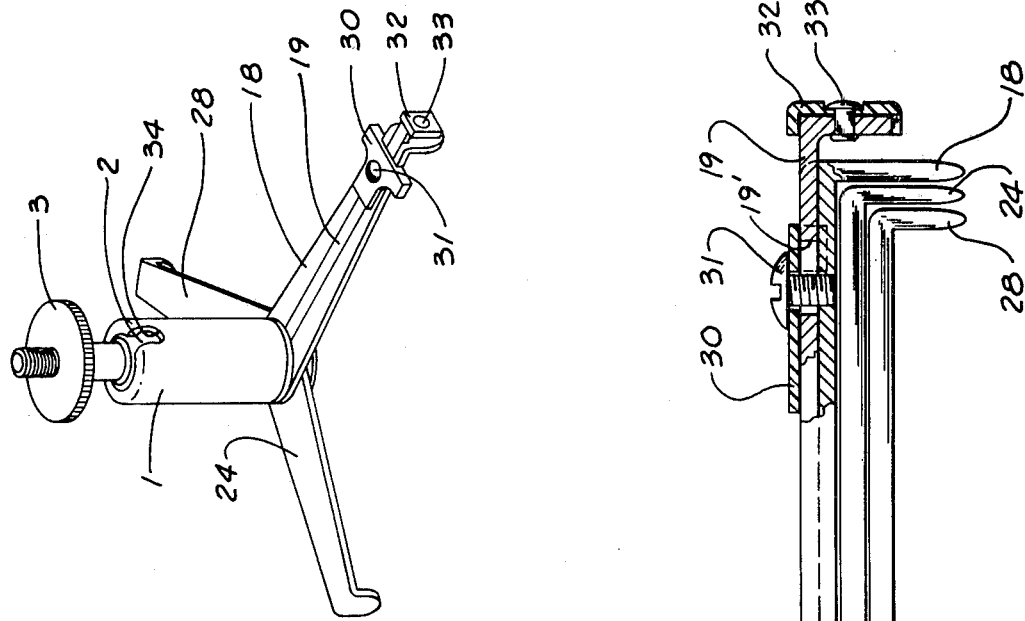
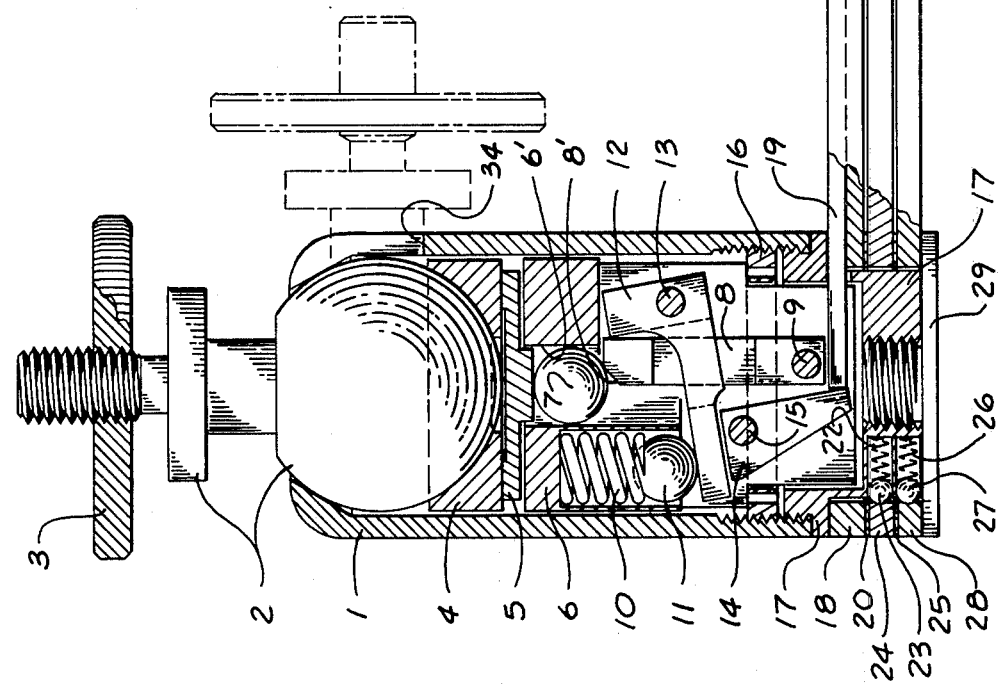

COLLAPSIBLE TRIPOD WITH SWIVEL LOCK

BACKGROUND OF THE INVENTION

The background of the invention will be discussed in two parts:

FIELD OF THE INVENTION

This invention relates to tripods and more particularly to a collapsible tripod having locking means for a swivel.

DESCRIPTION OF THE PRIOR ART

Collapsible three-legged supporting devices such as stools, tripods and musical instrument racks are well known in the arts and take various forms. A folding stool construction is shown in U.S. Pat. No. 2,026,427 with a collapsible pedestal construction for a stool being shown and described in U.S. Pat. No. 3,262,406. In the latter patent, the legs are pivoted from a common member about different axes for permitting alignment when folded.

U.S. Pat. No. 2,552,921 discloses a musical instrument rack having a plurality of legs secured to the base thereof for pivoting about a common shaft. Another adjustable support mechanism is shown in U.S. Pat. No. 1,931,714, the mechanism being adapted for supporting hot water boilers and the like.

A tripod mechanism is shown in U.S. Pat. No. 2,054,600, the tripod having a housing with an annular groove about the periphery thereof for receiving therein three bar-shaped leg members rotatable within the recess to provide a three-legged support while being rotatable to a collapsed position. The housing is provided with an inner tubular portion for receiving an extendable shaft which is suitably locked into position by means of a tapered lock nut encircling the housing and the shaft. This particular device illustrates the need for compact collapsible tripod arrangements. However, the tripod in this particular patent merely provides a transversely extending aperture in the shaft for securing a camera or other instrument thereto.

It is an object of the present invention to provide a new and improved collapsible tripod.

It is another object of this invention to provide a new and improved collapsible tripod having a swivel for attaching a camera or other instrument.

It is a further object of this invention to provide a lockable swivel ball means having a pressure plate normally urging against the ball and actuable by manual means coacting with one of the legs for relieving the pressure to permit swiveling.

SUMMMARY OF THE INVENTION

The foregoing and other objects of the invention are acccomplished by providing a tripod having a housing generally tubular in form with a neck down opening adjacent one end for receiving the ball portion of a swivel ball mount within the housing with the fastening portion extending through the opening of the housing. The interior of the housing is provided with pressure plate means having a cup clamp spherically contoured for urging against the ball portion, the pressure plate means being operable by means of a ball urging thereagainst in the normal position, the ball position being controlled by a lever within the housing operable by means of a release shaft partially within the housing and positioned within a channel of one of the legs, the other end of the release shaft being manually depressible for actuating the lever to drop the ball out of engagement with the pressure plate means to thereby permit the ball portion of the swivel ball mount to be pivoted. Three legs are provided at the bottom of the housing for rotation in the same plane about a common axis generally extending through the axis of the housing, the leg having the release shaft therein being in fixed relation to the housing with the other two legs being rotatable relative thereto for providing a small lightweight tripod having swivel ball locking means.

Other objects, features and advantages of the invention will become apparent from a reading of the specification when taken in conjunction with the drawings in which like reference numerals refer to like elements in the several views.

BRIEF DESCRIPTION OF THE DRAWINGS

FIG. 1 is a perspective view of the collapsible tripod according to the invention in its operative position; and FIG. 2 is a side view partially in cross section and partially broken away detailing the inner construction of the tripod of FIG. 1.

DESCRIPTION OF THE PREFERRED EMBODIMENT

Referring now to the drawings, and particularly to FIGS. 1 and 2, the tripod assembly includes a housing 1 which is a generally tubular member having a neck down opening adjacent the upper end and an open bottom, the housing 1 being generally circular in cross section.

Positioned within the interior of the housing 1 is a swivel ball mount 2 having a ball portion within the housing in proximity to the upper opening thereof with the diameter of the ball being larger than the opening, the swivel ball mount 2 having a mounting portion 3 extending through the opening for securing a camera or other instrument thereto. The mounting portion 3 is of conventional configuration including a threaded shaft with a lock nut.

Positioned immediately below the ball portion of the swivel ball mount 2 within the housing 1 is a cup clamp 4 having a generally spherical contour approximating that of the ball portion of swivel mount 2 for engaging the same in close abutting relation. A pressure plate 5 having a generally disc shape abuts the lower planar surface of the cup clamp 4. In spaced relation to the pressure plate 5 and immediately therebelow within housing 1 is a core block 6 having an upper horizontal surface in spaced relation to the bottom surface of pressure plate 5, the core block 6 having a centrally disposed aperture 6', the aperture 6' having a sufficiently large diameter for receiving therein a steel ball 7 having a diameter slightly smaller than the diameter of aperture 6'. The core block 6 is generally speaking a cast or machine block to which the components are mounted for insertion within the housing 1. Pivotally secured to the core block 6 is a cam member 8 pivoted about a shaft 9 extending vertically into the core block 6 adjacent a lower portion thereof, the cam 8 being generally bar-shaped and extending upwardly with a transversely disposed leg 8' at the end thereof, the leg 8' having a portion thereof removed in proximity to steel ball 7, and as will hereinafter be described, the leg 8' is adapted to urge against steel ball 7 which thereby urges against the pressure plate means including pressure plate 5 and cup clamp 4 for locking the ball portion of the swivel ball mount 2 in a fixed position. This occurs when the cam member 8 is generally vertical, and when pivoted away from the vertical position, that is clockwise as viewed in FIG. 2, the ball 7 will drop thereby permitting pressure plate 5 and cup clamp 4 to drop to thereby release the ball portion of the swivel ball mount 2.

Pivotally mounted within core block 6 is a generally L-shaped pressure plate release lever 12, which is pivoted about pivot pin 13 at the inner connection of the short leg and long leg thereof. The short leg abuts against the leg 8' of the cam member 8 while the long leg is urged downwardly by means of a compression spring 10 within a recess within core block 6, the compression spring 10 having a steel ball 11 positioned adjacent the opposite end thereof, the steel ball 11 being in contacting relation with the long leg of pressure plate release lever 12. By this arrangement, the pressure plate release lever 12 is urged in a counter-clockwise direction as viewed in FIG. 2 thereby urging the cam member 8 in a like counter-clockwise direction and leg 8' urges steel ball 7 upwardly against pressure plate 5, this being its normally biased position.

Beneath the long arm of pressure plate release lever 12 is a generally trapezoidal trip lever member 14 pivoted about pivot pin 15 with the upper edge of trip lever 14 in spaced proximate relation to the undersurface of the long arm of pressure plate release lever 12.

The core block 6 is suitably cut away to a reduced cross section and is retained in position by means of an adjustment ring 16 threadably inserted within the bottom of housing 1, the ring 16 being thereby adjustable for varying the position of core block 6 within housing 1 to thereby initially position the amount of force required for locking the ball of the swivel ball mount 2 within the housing 1.

Also threadably inserted within the bottom of housing 1 is a pivot plate member 17 which has a reduced diameter portion for receiving thereon in sequence a first leg 18, a washer member 20, a second leg 24, a spacer or washer 25 and a third leg 28 with a cap member 29 threadably secured within an aperture in the bottom of pivot plate 17, the cap 29 retaining the legs on the assembly. Each of the legs 18, 24 and 28 is generally bar-shaped with a bent portion adjacent the end thereof to provide feet for the tripod, and as can be seen in FIG. 2 leg 18 is the outermost leg with leg 24 being slightly shorter than leg 18 and leg 28 being slightly shorter than leg 24 to permit the legs to be pivoted about a common axis, that axis being generally the axis of the housing 1, to thereby permit the legs to be folded in general alignment, thus providing a compact collapsible tripod. The leg 18 is fixed relative to housing 1. The other two legs 24 and 28 have an enlarged opening encircling the reduced diameter portion of pivot plate 17 with each of the openings of legs 24 and 28 being provided with suitable detents for engaging spring biased detent balls, that is spring 22 and ball 23 for leg 24 and spring 26 and ball 27 for leg 28. With the inner surfaces of the openings appropriated, detented legs 24 and 28 can thereby be displaced 120° relative to each other and 120° from leg 18.

The actuating mechanism for disabling the locking of the swivel ball mount 2 is accomplished by providing a release shaft 19 which extends through a channel longitudinally within leg 18, the shaft 19 having one end thereof in normally abutting relation with one end of the trip lever 14. The other end of release shaft 19 is suitably bent or otherwise configured for receiving a plastic or rubber thumb button 32 which is secured to the bent end thereof by means of a rivet 33. To assist in gripping and operating the release shaft 19, the leg 18 is provided with a transversely extending finger grip member 30 which is generally T-shaped, the finger grip member 30 being secured by means of a screw member 31 extending therethrough, thencethrough an elongated slot 19' within release shaft 19 for threadably engaging the leg member 18. The release shaft 19 is thus manually operable against the force of the compression spring 10.

In operation, as viewed in FIG. 2, the tripod is shown in its collapsed position with the three legs thereof in overlapping aligned relation. With legs 24 and 28 pivoted about pivot plate 17 until the appropriate detented positions are reached, the tripod will be in the assembled position shown in FIG. 1. Normally the parts will be shown in the operative position of FIG. 2 with the cam member 8 being urged counter-clockwise under force of the pressure plate release lever 12 to thereby urge steel ball 7 upwardly against pressure plate 5 which transmits this force upwardly to cup clamp 4 thereby urging against the ball portion of swivel ball mount 2 to restrain the swivel ball mount from rotation or pivoting. In order to enable the swivel ball mount 2 to be rotated to the position shown in dotted lines, with the neck thereof extending through the slot 34 adjacent the upper opening, the thumb button 32 is depressed with the thumb with the fingers gripping the finger grip 30. The release shaft 19 then moves to the left as viewed in FIG. 2 thereby pivoting the trip lever member 14 clockwise until the upper edge thereof urges against the lower surface of the long arm of pressure plate release lever 12 against the force of the spring 10 and steel ball 11 urging against the opposite surface. This effectively rotates the pressure plate release lever 12 thereby permitting the cam member 8 to move freely clockwise with steel ball 7 within core plate 6 dropping downwardly under the force and gravity to thereby release the force on pressure plate 5 and cup clamp 4 thereby enabling the swivel ball mount to be rotated to the position shown in dotted lines.

The tripod according to the instant invention is compact and efficient and may be folded into a small unit that can remain attached to a camera while not in use with only a short period of time required for set-up. Furthermore, with the swivel ball mount 2, the camera on the tripod can be readily adjusted to the desired angle, be it horizontal or vertical very readily by use of thumb pressure on thumb button 32. While there has been shown and described a preferred embodiment, it is to be understood that various other adaptations and modifications may be made within the spirit and scope of the invention.

What is claimed is:

1. In a tripod, the combination comprising:
a generally hollow housing having a bottom and a top opening;
three legs, one of said legs being mounted to the bottom of said housing in fixed relation therewith, the other two of said legs being pivotally coupled to the bottom of said housing;
swivel ball mount means having a ball portion swivelly positioned within said housing and a fastening portion extending through said opening;
pressure plate means within said housing, said pressure plate means being configured for engaging a part of said ball portion;

means normally biasing said pressure plate means into contact with said ball portion thereby restraining said ball portion from swivelling; and manually operable means operatively coupled to said one leg and to a trip lever within said housing, said trip lever being actuable by said manually operable means against said normally biasing means to thereby free said pressure plate means from the force of its bias for permitting swivelling of said ball portion.

2. The combination according to claim 1 wherein said manually operable means is a release shaft within a channel formed in said one leg, said shaft having one end extending into said housing and being slidabley actuated within said channel by pressure on the other end.

3. The combination according to claim 1 wherein said pressure plate means includes a pressure plate displaceable axially relative to said housing and said normally biasing means includes a spring member and a biasing wall operatively coupled through another mechanism to said pressure plate, said another mechanism being actuable by said manually operable means.

4. The combination according to claim 3 wherein said tripod includes a core block positioned within said housing, said core block having an upper surface and a centrally disposed aperture, said upper surface having said pressure plate adjacent thereto, and said another mechanism includes a pressure ball being positioned within said aperture for co-acting with said pressure plate, a cam member being pivotally coupled within the lower part of said core block and having a cam surface on the free end thereof engaging said pressure ball, and a lever member being pivotally coupled within said core block and having a first leg biased by said spring member to urge through said biasing ball a second leg thereof against the free end of said cam member for urging said pressure ball toward said pressure plate for locking said ball portion.

5. The combination according to claim 4 wherein said trip lever is pivotally coupled within said core block, said trip lever being actuable by said manually operable means for urging against said one leg of said lever member for pivoting the same against said biasing ball and thence against the force of said spring member enabling said cam member to pivot for permitting said pressure ball to release said pressure plate.

6. The combination according to claim 5 wherein said manually operable means is a release shaft within a channel formed in said one leg, said shaft having one end extending into said housing and being slidabley actuated within said channel by pressure on the other end.

7. The combination according to claim 6 wherein each of said legs is generally bar-shaped and bent at the free end thereof, each of said legs being a different length for permitting the other two of said legs to be pivoted into aligned relation with said one leg.

8. The combination according to claim 5 wherein said spring member is positioned within a recess in said core block having one end adjacent said core block and the opposite end against said biasing ball, said biasing ball being in contacting relation with said first leg of said lever member.

* * * * *

UNITED STATES PATENT AND TRADEMARK OFFICE
CERTIFICATE OF CORRECTION

PATENT NO. : 4,214,724

DATED : July 29, 1980

INVENTOR(S) : William N. Geiger

It is certified that error appears in the above—identified patent and that said Letters Patent is hereby corrected as shown below:

Column 5, line 21, "wall" should read -- ball --.

Signed and Sealed this

Twenty-eighth Day of April 1981

[SEAL]

Attest:

RENE D. TEGTMEYER

Attesting Officer

Acting Commissioner of Patents and Trademarks